United States Patent
Oveyssi et al.

(10) Patent No.: US 7,035,053 B1
(45) Date of Patent: Apr. 25, 2006

(54) DISK DRIVE EMPLOYING A CONSTANT CONTACT INERTIAL LATCH

(75) Inventors: Kamran Oveyssi, San Jose, CA (US); Jorge Haro, Stockton, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 283 days.

(21) Appl. No.: 10/160,317

(22) Filed: Jun. 1, 2002

(51) Int. Cl.
*G11B 5/54* (2006.01)

(52) U.S. Cl. .................................................. 360/256.4
(58) Field of Classification Search ................. 360/256, 360/256.1, 256.2, 256.3, 256.4
See application file for complete search history.

(56) References Cited

U.S. PATENT DOCUMENTS

| | | | |
|---|---|---|---|
| 5,303,101 A | | 4/1994 | Hatch et al. |
| 5,305,170 A | * | 4/1994 | Dion ................. 360/256.4 |
| 5,377,065 A | | 12/1994 | Morehouse et al. |
| 5,404,257 A | | 4/1995 | Alt |
| 5,528,437 A | | 6/1996 | Mastache |
| 5,636,090 A | | 6/1997 | Boigenzahn et al. |
| 5,859,751 A | | 1/1999 | Tacklind |
| 5,870,256 A | * | 2/1999 | Khanna et al. ........ 360/256.4 |
| 6,091,587 A | | 7/2000 | Hatch et al. |
| 6,118,636 A | * | 9/2000 | Hatch et al. ........... 360/256.4 |
| 6,163,440 A | | 12/2000 | Takahashi et al. |
| 6,185,074 B1 | | 2/2001 | Wang et al. |
| 6,529,349 B1 | | 3/2003 | Byun et al. |
| 6,624,980 B1 | * | 9/2003 | Watson et al. ......... 360/256.4 |
| 2001/0024344 A1 | * | 9/2001 | Miyamoto et al. ..... 360/256.4 |

* cited by examiner

*Primary Examiner*—A. J. Heinz
*Assistant Examiner*—Mark Blouin
(74) *Attorney, Agent, or Firm*—Howard H. Sheerin, Esq.

(57) ABSTRACT

A disk drive is disclosed employing a constant contact inertial latch for latching an actuator arm assembly while the disk drive is powered down to protect against physical shocks. The inertial latch comprises a body having a protruding arm and a pivot surface. When the actuator arm assembly is in the latched position, the protruding arm is in constant contact with the actuator arm assembly applying a latching force to the actuator arm assembly. During a physical shock, an inertia of the body biases the body rotationally about the pivot surface in a first direction to increase the latching force applied to the actuator arm assembly by the protruding

17 Claims, 4 Drawing Sheets

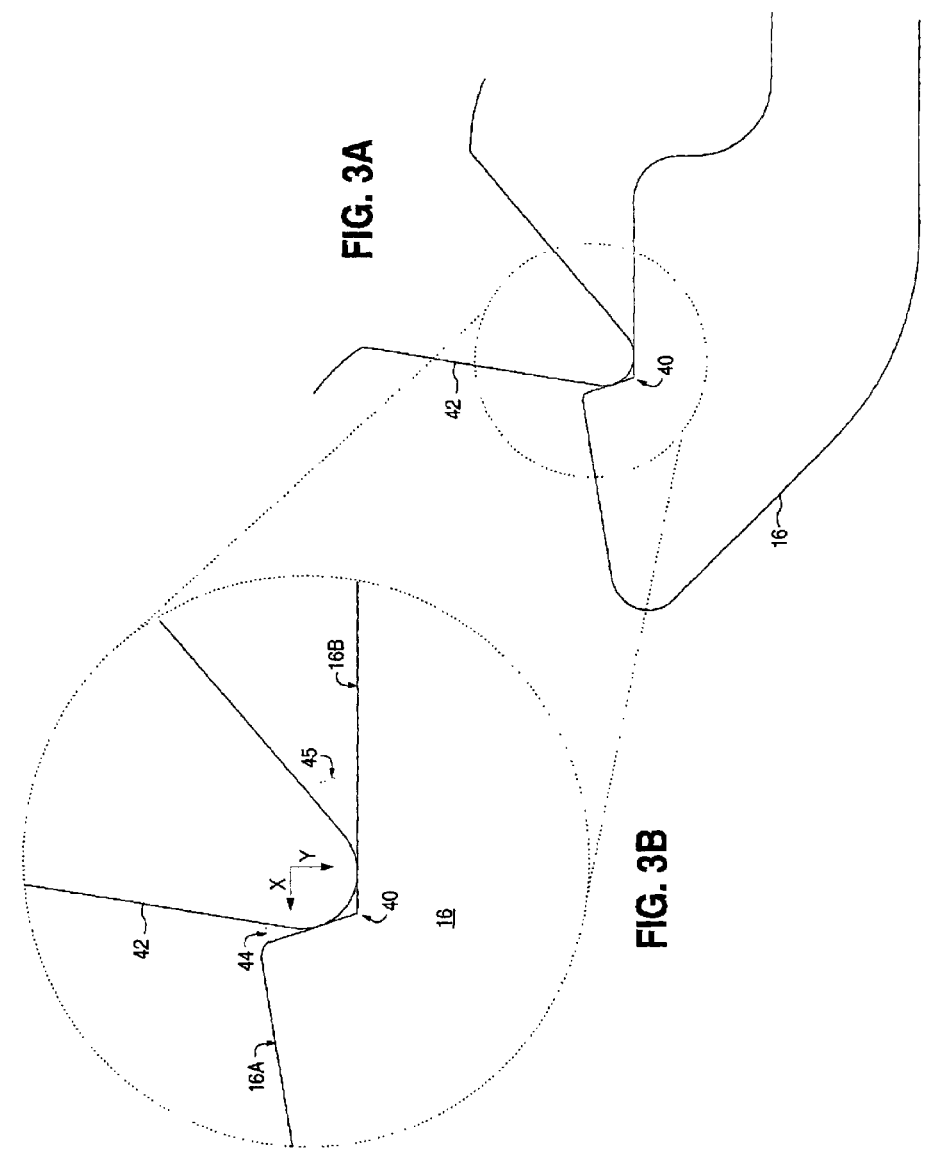

DISK DRIVE EMPLOYING A CONSTANT CONTACT INERTIAL LATCH

BACKGROUND OF THE INVENTION

1. Field of the Invention

The present invention relates to disk drives for computer systems. More particularly, the present invention relates to a disk drive employing a constant contact inertial latch.

2. Description of the Prior Art

A computer system usually includes one or more disk drives for economical, non-volatile data storage. Prior art disk drives typically comprise a base for housing a disk and a head attached to a distal end of an actuator arm. A spindle motor rotates the disk about its axis, and a voice coil motor (VCM) rotates the actuator arm about a pivot in order to position the head radially over the disk. While the disk drive is powered down the head is typically parked in order to protect the data recorded on the disk as well as prevent damage to the head. The head may be parked on a landing zone on the inner diameter (ID) of the disk, or alternatively, the head may be parked on a ramp located at the periphery of the disk (a.k.a., ramp loading/unloading). If parked on a landing zone, the disk drive typically employs a magnetic latch to help retain the head in the parked position when the disk drive is subject to a physical shock, particularly a rotational shock. The magnetic latch typically comprises a magnet attached or embedded into a crash stop for latching onto a tang extending from a base end of the actuator arm. If the head is parked on a ramp, the frictional force of the ramp helps retain the head in the parked position. However, in either case if the force of a rotational shock exceeds the latching force of the magnetic latch or the frictional force of the ramp, the actuator arm will "unlatch" causing the head to fly over the data area of the disk.

In prior art disk drives an inertial latch has been employed which prevents the actuator arm from unlatching when the disk drive is subject to large rotational shocks. The inertial latch comprises a protruding arm having an inertia which causes it to rotate about a pivot and "catch" the actuator arm to prevent it from unlatching during a rotational shock. The inertial latch also comprises a biasing mechanism (e.g., a spring) for applying a biasing force to the arm in order to reposition it when the rotational shock subsides. However, it is difficult to design an inertial latch that will rotate and catch the actuator arm before it unlatches under all circumstances. That is, depending on the character and magnitude of the rotational shock the inertial latch may not rotate in time to catch the actuator arm, particularly when the disk drive is subject to smaller rotational shocks sufficient to defeat the force of a magnetic latch or frictional force of a ramp. A larger magnet having an increased latching force may be employed to compensate for smaller rotational shocks, but this requires a more expensive VCM with sufficient torque to unlatch the actuator arm when the disk drive is powered on.

There is, therefore, a need for a disk drive which cost effectively prevents the actuator arm from unlatching when the disk drive is subject to physical shocks while powered down.

SUMMARY OF THE INVENTION

The present invention may be regarded as a disk drive comprising a disk, a spindle motor for rotating the disk, an actuator arm assembly including an actuator arm and a head coupled to a distal end of the actuator arm, and an inertial latch for maintaining the actuator arm assembly in a latched position when the disk drive is subject to a physical shock while powered down. The inertial latch comprises a body having a protruding arm and a pivot surface. When the actuator arm assembly is in the latched position, the protruding arm is in constant contact with the actuator arm assembly applying a latching force to the actuator arm assembly. During the physical shock an inertia of the body biases the body rotationally about the pivot surface in a first direction to increase the latching force applied to the actuator arm assembly by the protruding arm.

In one embodiment, the inertial latch further comprises a means for biasing the body rotationally about the pivot surface in the first direction to bias the protruding arm toward the actuator arm assembly when the actuator arm assembly is rotated into the latched position. In one embodiment, the means for biasing comprises a spring, and in one embodiment a strip spring.

In another embodiment, the protruding arm comprises a concave surface for engaging a convex surface of the actuator arm assembly. In one embodiment, the actuator arm assembly further comprises a voice coil portion comprising a tang, and the convex surface of the actuator arm assembly comprises the tang.

In one embodiment when the actuator arm assembly is rotated into the latched position, the convex surface first pushes on the protruding arm to rotate the body about the pivot surface in a second direction opposite the first direction. As the convex surface approaches the latched position, the means for biasing rotates the body about the pivot surface in the first direction to bias the concave surface of the protruding arm against the convex surface of the actuator arm assembly.

In one embodiment, the inertial latch further comprises a means for biasing the body rotationally about the pivot surface in a second direction opposite the first direction to reduce the latching force applied to the actuator arm assembly when the physical shock subsides. In one embodiment, the means for biasing comprises a spring, and in one embodiment a strip spring.

In one embodiment when the actuator arm assembly is in the latched position, a contact angle between the protruding arm and the actuator arm assembly is greater than ten degrees.

The present invention may also be regarded as a method of compensating for physical shocks to a disk drive while powered down. The disk drive comprising a disk, a spindle motor for rotating the disk, an actuator arm assembly including an actuator arm and a head coupled to a distal end of the actuator arm, and an inertial latch for maintaining the actuator arm assembly in a latched position when the disk drive is subject to a physical shock. The inertial latch comprising a body having a protruding arm and a pivot surface. The method comprises the step of rotating the actuator arm assembly into the latched position. While the actuator arm is in the latched position, the protruding arm is engaged with the actuator arm assembly to apply a latching force to the actuator arm assembly such that the protruding arm is in constant contact with the actuator arm assembly. During the physical shock, the body is biased rotationally about the pivot surface in a first direction due to an inertia of the body to increase the latching force applied to the actuator arm assembly by the protruding arm. When the physical shock subsides, the body is biased rotationally about the pivot surface in a second direction opposite the first direction to reduce the latching force applied to the actuator arm assembly.

BRIEF DESCRIPTION OF THE DRAWINGS

FIGS. 3A–3B show a magnified view of the protruding arm contacting the actuator arm assembly at an angle greater than ten degrees which allows the actuator arm assembly to unlatch during normal operation.

DESCRIPTION OF THE PREFERRED EMBODIMENTS

Figure 1A:
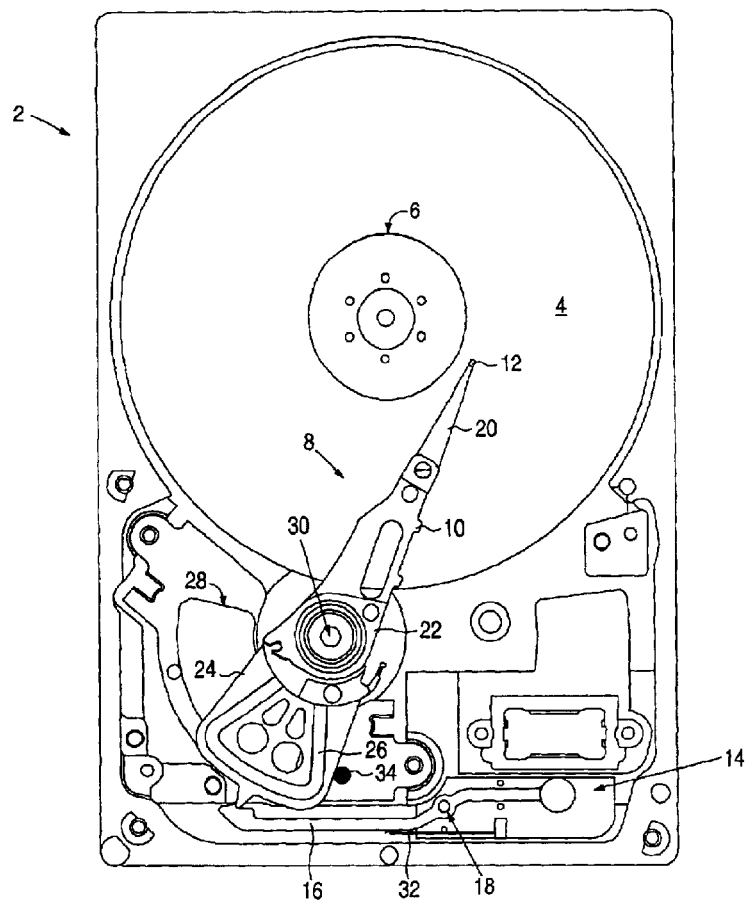
FIG. 1A is a top view of a disk drive according to an embodiment of the present invention, including a constant contact inertial latch for latching an actuator arm assemnbly while the disk drive is powered down.

FIG. 1A shows a stop view of a disk drive 2 according to an embodiment of the present invention comprising a disk 4, a spindle motor 6 for rotating the disk 4, and an actuator arm assembly 8 comprising an actuator arm 10 and a head 12 coupled to a distal end of the actuator arm 10. The disk drive 2 further comprises an inertial latch 14 for maintaining the actuator arm assembly 8 in a latched position when the disk drive 2 is subject to a physical shock while powered down. The inertial latch 14 comprising a body having a protruding arm 16 and a pivot surface 18. When the actuator arm assembly 8 is in the latched position (as shown in FIG. 1A), the protruding arm 16 is in constant contact with the actuator arm assembly 8 applying a latching force to the actuator arm assembly 8. During the physical shock an inertia of the body biases the body rotationally about the pivot surface 18 in a first direction to increase the latching force applied to the actuator arm assembly 8 by the protruding arm 16.

In the embodiment of FIG. 1A, the head 12 is coupled to the distal end of the actuator arm 10 through a suspension load beam 20 which biases the head 12 toward the surface of the disk 4. The actuator arm assembly 8 also comprises an actuator body 22 connected to a base end of the actuator arm 10, and a voice coil portion 24 connected to the actuator body 22. The voice coil portion 24 comprises a voice coil 26 wherein when current is applied to the voice coil 26 the resulting magnetic flux interacts with a magnet 28 to rotate the actuator body 22 about a pivot 30, thereby actuating the head 12 radially over the disk 4. The voice coil 26 and magnet 28 are referred to as a voice coil motor (VCM). When the disk drive 2 is powered down, the actuator arm assembly 8 is rotated into the latched position in order to park the head 12 so as to protect the head 12 as well as the data area of the disk 4. In the embodiment of FIG. 1A, the actuator arm assembly 8 is rotated in the counter-clockwise direction in order to park the head 12 in a landing zone on an inner diameter of the disk 4. In an alternative embodiment, the actuator arm assembly 8 is rotated in the clockwise direction in order to park the head 12 on a ramp located at an outer periphery of the disk 4.

In one embodiment, the inertial latch 14 further comprises a means for biasing the body rotationally about the pivot surface 18 in the first direction to bias the protruding arm 16 toward the actuator arm assembly 8 when the actuator arm assembly 8 is rotated into the latched position. Any suitable means may be employed to apply the biasing force. In the embodiment of FIG. 1A, a strip spring 32 applies the biasing force to rotate the body about the pivot surface 18. In another embodiment, a magnet is mounted near the inertial latch 14 and the body of the inertial latch 14 comprises a metal piece which is attracted to the magnet to apply the biasing force. In yet another embodiment, the protruding arm 16 comprises metal (e.g., embedded into or attached to the protruding arm 16) which is attracted to the magnet 28 of the VCM to apply the biasing force. In still another embodiment, an elastic material such as a rubber stopper, is mounted near the inertial latch 14 and the biasing force is generated by the protruding arm 16 pressing against the elastic material.

The embodiment of FIG. 1A further comprises an elastic stopper 34 (e.g., a cylindrical rubber stopper) mounted to the base of the disk drive 2 and providing a crash stop for the actuator arm assembly 8 when rotated into the latched position. In one embodiment, the elastic stopper 34 dampens movement of the actuator arm assembly 8 so that it settles quickly into the latched position by attenuating "latch bounce".

Figure 2A:
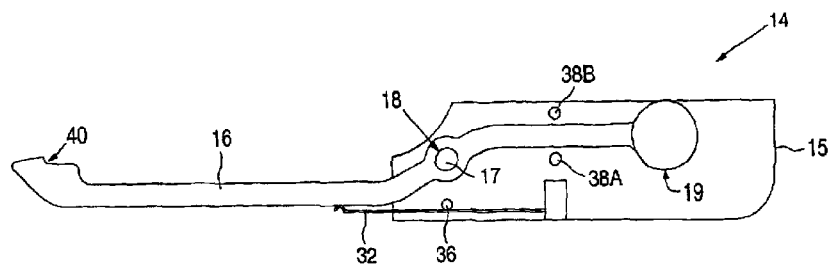
FIG. 2A shows a top view of the inertial latch comprising a body having a protruding arm and a pivot surface.
Figure 2B:
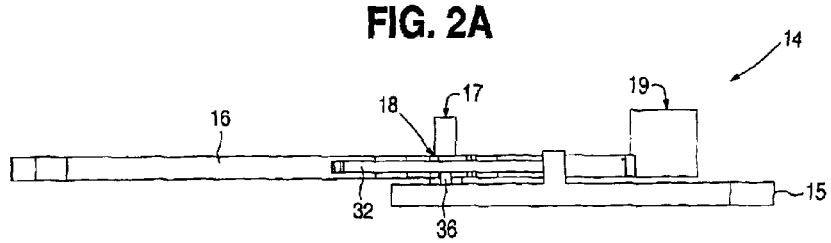
FIG. 2B shows a side view of the inertial latch of FIG. 2A, including a strip spring for biasing the body rotationally about the pivot surface in order to bias the protruding arm toward the actuator arm assembly.

FIG. 2A shows a magnified top view of the inertial latch 14 and FIG. 2B shows a magnified side view of the inertial latch 14 with the body having a protruding arm 16 and a pivot surface 18. In the embodiments of FIG. 2A and 2B the inertial latch 14 comprises a base 15 having a post 17 about which the pivot surface 18 rotates. The base 15 is attached (e.g., screwed or glued) to the base of the disk drive 2. In an alternative embodiment, the base 15 and post 17 are integrally formed with the base of the disk drive 2.

The inertia of the body of the inertial latch 14 should be sufficient relative to the inertia of the actuator arm assembly 8 to ensure the inertial latch 14 provides sufficient latching force over a wide range of physical shocks to counteract the inertia of the actuator arm assembly 8. The body is formed with suitable material (e.g., dense plastic, plastic with embedded metal, etc.) to achieve the desired inertia. In the embodiment of FIG. 2A and 2B the body comprises a mass 19 at the end opposite the protruding arm 16 which increases the inertia of the body.

FIGS. 2A and 2B also show the strip spring 32 for biasing the body rotationally about the pivot surface 18 in the clockwise direction to bias the protruding arm 16 toward the actuator arm assembly 8 when the actuator arm assembly 8 is rotated into the latched position. The strip spring 32 also generates a biasing force to rotate the body rotationally about the pivot surface 18 in the counter-clockwise direction to reduce the latching force applied to the actuator arm assembly 8 when a physical shock subsides. In the embodiment of FIG. 2A, the inertial latch 14 further comprises a post 36 abutting the strip spring 32 at a predetermined location along the length of the strip spring 32 which establishes the minimum biasing force applied to the protruding arm 16 against the actuator arm assembly 8.

Figure 2C:
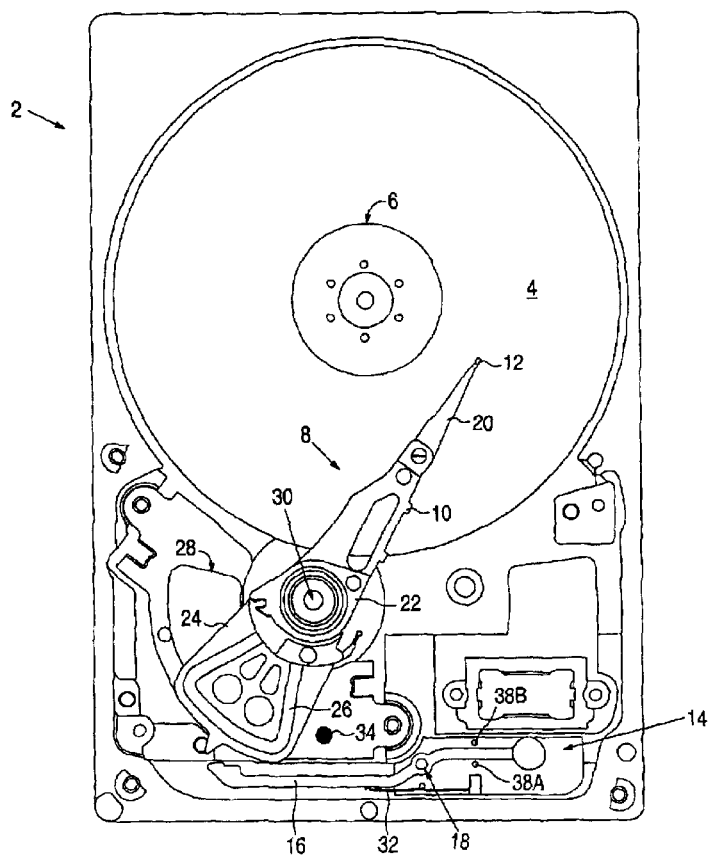
FIG. 2C shows a top view of the disk drive of FIG. 1A wherein the actuator arm assembly is in an unlatched position during a normal operating mode of the disk drive.

FIG. 2C shows a top view of the disk drive 2 of FIG. 1A wherein the actuator arm assembly 8 is in an unlatched position during a normal operating mode of the disk drive. As shown in the embodiment of FIG. 2A, the inertial latch 14 comprises a post 38A which limits the clockwise rotation of the body to prevent the protruding arm 16 from impeding the actuator arm 8 when rotated into the latched position. The inertial latch 14 of FIG. 2A further comprises a post 38B which limits the counter-clockwise rotation of the body to provide a "hard stop" for the actuator arm assembly 8 when rotated into the latched position.

Figure 1B:
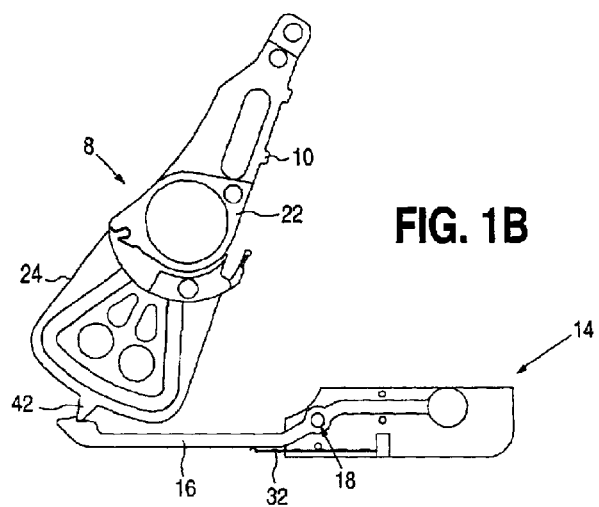
FIG. 1B shows details of part of the actuator arm assembly latched by the constant contact inertial latch.

Any suitable configuration may be employed for engaging the protruding arm 16 with the actuator arm assembly 8. In one embodiment, the protruding arm 16 comprises a concave surface 40 (FIG. 2A) for engaging a convex surface of the actuator arm assembly 8 (but the reverse configuration may also be employed). In the embodiment shown in FIG. 1B, the voice coil portion 24 of the actuator arm assembly 8 comprises a tang 42 and the convex surface of the actuator arm assembly 8 comprises the tang 42. In one embodiment the concave surface 40 of the protruding arm 16 and the tang 42 are formed from of a wear resistant, smooth plastic which helps prevent particle contamination due to wear.

FIG. 3A shows a magnified view of the concave surface 40 of the protruding arm 16 engaging the convex surface (tang 42) of the actuator arm assembly 8. In one embodiment as shown in the magnified view of FIG. 3B, a contact angle 44 between the protruding arm 16 and the actuator arm assembly 8 is greater than ten degrees which allows the actuator arm assembly 8 to unlatch during normal operation of the disk drive 2. During a physical shock the inertia of the actuator arm assembly 8 generates a torque on the protruding arm 16 in the X direction which is counteracted by the force of the post 17 constraining the body of the inertial latch 14. Because of the contact angle 44, the physical shock also generates a torque in the Y direction which is counteracted by the latching force of the inertial latch 14. The latching force in the Y direction is established by the contact angle 44, together with the inertia of the inertial latch 14 and friction between the concave surface 40 and convex surface (tang 42). As the inertia of the body increases the latching force during physical shocks increases, and as the contact angle 44 increases the latching force decreases. The contact angle 44 is preferably selected so that the VCM is just able to overcome the friction between the protruding arm 16 and actuator arm assembly 8 as well as the latching force applied by the protruding arm 16 during normal operation of the disk drive 2.

In the embodiment of FIG. 3B, the protruding arm 16 comprises a ramped surface 16A angled with respect to the tang 42. As described below with reference to FIGS. 4A–4C, when the actuator arm assembly 8 is rotated into the latched position the tang 42 contacts the ramp surface 16A and pushes on the protruding arm 16 to rotate the body about the pivot surface 18 in the counter-clockwise direction. When the tang 42 clears the ramp surface 16A it may continue to travel along surface 16B as the actuator arm assembly 8 continues to rotate. In one embodiment surface 16B is also ramped with respect to the tang 42 and the angle 45 between the ramp surface 16B and the tang 42 selected so as to bias the tang 42 back toward the notch of the concave surface 40.

Figure 4A:
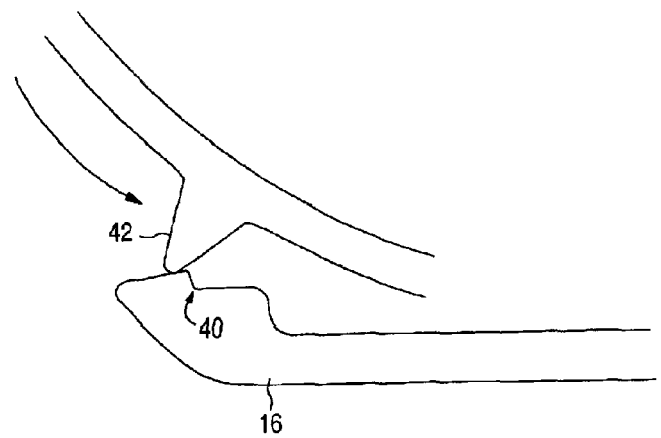
FIGS. 4A–4C illustrate the actuator arm assembly rotating into the latched position and the protruding arm engaging the actuator arm assembly.
Figure 4B:
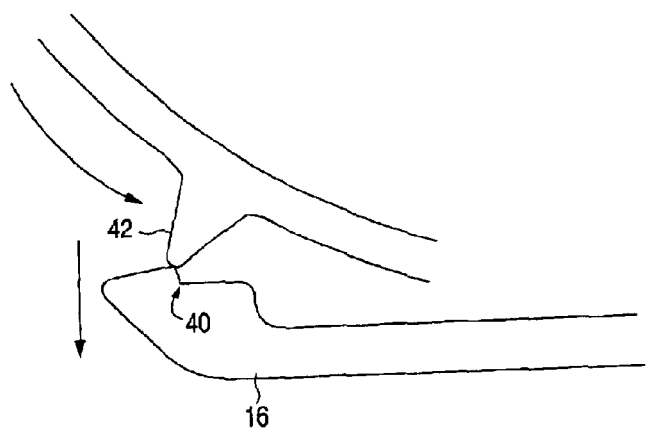
Figure 4C:
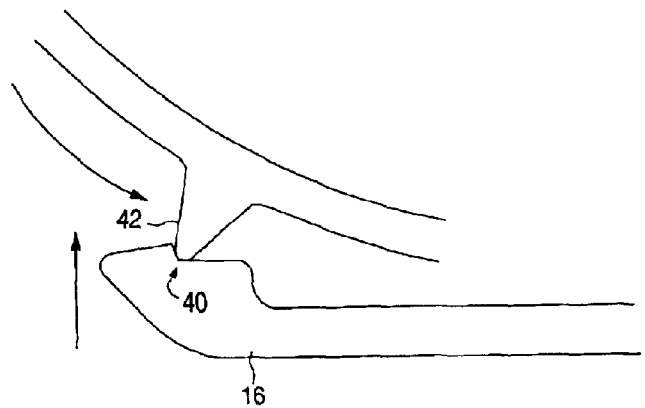

FIGS. 4A–4C illustrate the operation of the inertial latch 14 when the actuator arm assembly 8 is rotated into the latched position the convex surface (tang 42) first pushes on the protruding arm 16 to rotate the body about the pivot surface 18 in the counter-clockwise direction as shown in FIG. 4B. As the convex surface (tang 42) approaches the latched position, the strip spring 32 rotates the body about the pivot surface 18 in the clockwise direction to bias the concave surface 40 of the protruding arm 16 against the convex surface (tang 42) of the actuator arm assembly 8 as illustrated in FIG. 4C. When unlatching the actuator arm assembly 8, the convex surface (tang 42) pushes on the protruding arm 16 to rotate the body about the pivot surface 18 in the counter-clockwise direction until the convex surface (tang 42) clears the concave surface 40. The strip spring 32 then biases the body about the pivot surface 18 in the clockwise direction to rotate the protruding arm 16 back into its neutral position.

In the embodiment shown in FIG. 1A the body of the inertial latch 14 rotates in a clockwise direction during a physical shock to increase the latching force applied by the protruding arm 16. However, any suitable configuration may be employed, including the reverse configuration wherein the body of the inertial latch 14 rotates in a counter-clockwise direction during a physical shock to increase the latching force applied by the protruding arm 16. In addition, the inertial latch 14 may be employed in a "ramp-loading" design wherein the actuator arm assembly 8 is latched while the head 12 is parked on a ramp at the outer periphery of the disk 4.

Because the protruding arm 16 of the inertial latch 14 is in constant contact with the actuator arm assembly 8 while in the latched position, the inertial latch 14 provides a latching force over a wide range of physical shocks. The conventional magnetic latch employed in prior art disk drives for augmenting an inertial latch to compensate for small amplitude physical shocks is obviated by the embodiments of the present invention. Further, there is no time delay between a physical shock and the latching effect of the inertial latch 14 as compared to the prior art inertial latches that are not in constant contact with the actuator arm assembly. Therefore the timing problems inherent in the prior art inertial latches are obviated by the constant contact inertial latch disclosed in the embodiments of the present invention.

We claim:

1. A disk drive comprising:
   (a) a disk;
   (b) a spindle motor for rotating the disk
   (c) an actuator arm assembly comprising:
      an actuator arm; and
      a head coupled to a distal end of the actuator arm; and
   (d) an inertial latch for maintaining the actuator arm assembly in a parked position while the disk drive is powered down, the inertial latch comprising a body having a protruding arm and a pivot surface, wherein:
      when the actuator arm assembly is in the parked position, the protruding arm is in constant contact with the actuator arm assembly applying a latching force to the actuator arm assembly while the disk drive is not subject to a physical shock;
      during a physical shock, an inertia of the body biases the body rotationally about the pivot surface in a first direction to increase the latching force applied to the actuator arm assembly by the protruding arm; and
      the protruding arm comprises a concave surface for engaging a convex surface of the actuator arm assembly while the actuator arm is in the latched position.

2. The disk drive as recited in claim 1, wherein the inertial latch further comprises a means for biasing the body rotationally about the pivot surface in the first direction to bias the protruding arm toward the actuator arm assembly when the actuator arm assembly is rotated into the latched position.

3. The disk drive as recited in claim 1, wherein the means for biasing comprises a spring.

4. The disk drive as recited in claim 1, wherein:
(a) the actuator arm assembly further comprises a voice coil portion comprising a tang; and
(b) the convex surface of the actuator arm assembly comprises the tang.

5. The disk drive as recited in claim 1, wherein when the actuator arm assembly is rotated into the parked position:
(a) the convex surface first pushes on the protruding arm to rotate the body about the pivot surface in a second direction opposite the first direction; and
(b) as the convex surface approaches the latched position, the means for biasing rotates the body about the pivot surface in the first direction to bias the concave surface of the protruding arm against the convex surface of the actuator arm assembly.

6. The disk drive as recited in claim 1, wherein the inertial latch further comprises a means for biasing the body rotationally about the pivot surface in a second direction opposite the first direction to reduce the latching force applied to the actuator arm assembly when the physical shock subsides.

7. The disk drive as recited in claim 6, wherein the means for biasing comprises a spring.

8. The disk drive as recited in claim 7, wherein the spring comprises a strip spring.

9. The disk drive as recited in claim 1, wherein when the actuator arm assembly is in the latched position a contact angle between the protruding arm and the actuator arm assembly is greater than ten degrees.

10. A method of compensating for physical shocks to a disk drive while powered down, the disk drive comprising a disk, a spindle motor for rotating the disk, an actuator arm assembly including an actuator arm and a head coupled to a distal end of the actuator arm, and an inertial latch for maintaining the actuator arm assembly in a parked position, the inertial latch comprising a body having a protruding arm and a pivot surface, wherein the protruding arm comprises a concave surface for engaging a convex surface of the actuator arm assembly while the actuator arm is in the parked position, the method comprising the steps of:
(a) rotating the actuator arm assembly into the parked position; and
(b) while the actuator arm assembly is in the parked position:
engaging the protruding arm with the actuator arm assembly to apply a latching force to the actuator arm assembly such that the protruding arm is in constant contact with the actuator arm assembly while the disk drive is not subject to a physical shock;
during a physical shock, biasing the body rotationally about the pivot surface in a first direction due to an inertia of the body to increase the latching force applied to the actuator arm assembly by the protruding arm; and
when the physical shock subsides, biasing the body rotationally about the pivot surface in a second direction opposite the first direction to reduce the latching force applied to the actuator arm assembly.

11. The method as recited in claim 10, wherein a spring biases the body rotationally about the pivot surface in the second direction opposite the first direction when the physical shock subsides.

12. The method as recited in claim 11, wherein the spring comprises a strip spring.

13. The method as recited in claim 10, wherein the step of engaging the protruding arm with the actuator arm assembly comprises the step of biasing the body rotationally about the pivot surface in the first direction to bias the protruding arm toward the actuator arm assembly.

14. The method as recited in claim 13, wherein a spring biases the body rotationally about the pivot surface in the first direction to bias the protruding arm toward the actuator arm assembly.

15. The method as recited in claim 10, wherein:
(a) the actuator arm assembly further comprises a voice coil portion comprising a tang; and
(b) the convex surface of the actuator arm assembly comprises the tang.

16. The method as recited in claim 10, wherein the step of rotating the actuator arm assembly into the parked position comprises the steps of:
(a) the convex surface first pushing on the protruding arm to rotate the body about the pivot surface in a second direction opposite the first direction; and
(b) as the convex surface approaches the latched position, rotating the body about the pivot surface in the first direction to bias the concave surface of the protruding arm against the convex surface of the actuator arm assembly.

17. The method as recited in claim 10, wherein when the actuator arm assembly is in the latched position a contact angle between the protruding arm and the actuator arm assembly is greater than ten degrees.

* * * * *